Sept. 5, 1967          R. U. GARRETT          3,340,132
LAMINATING PROCESS AND APPARATUS
Filed Aug. 15, 1963          3 Sheets-Sheet 1
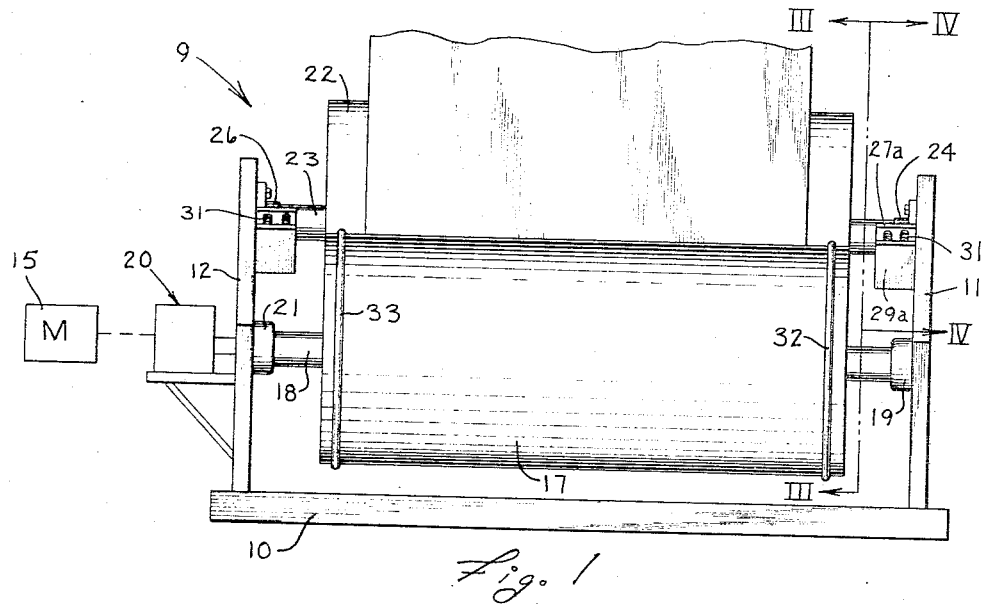
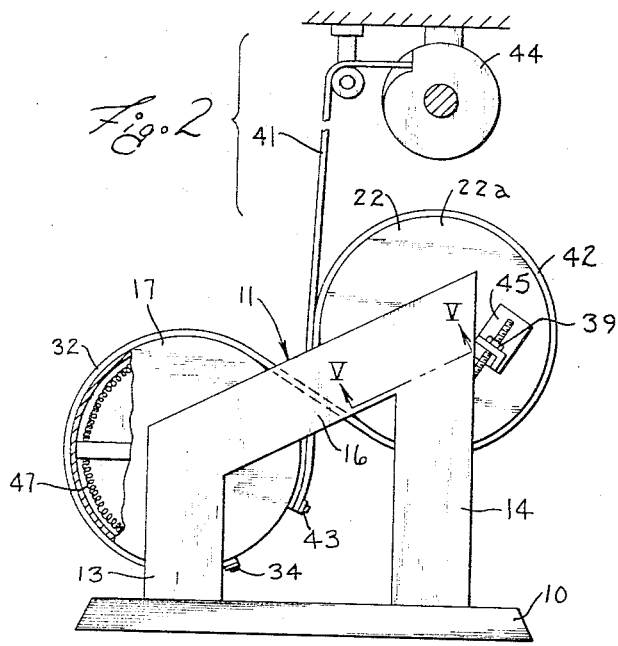
INVENTOR.
RUSSELL U. GARRETT
BY
Woodhams, Blanchard and Flynn
ATTORNEYS Sept. 5, 1967  R. U. GARRETT  3,340,132
LAMINATING PROCESS AND APPARATUS
Filed Aug. 15, 1963  3 Sheets-Sheet 2
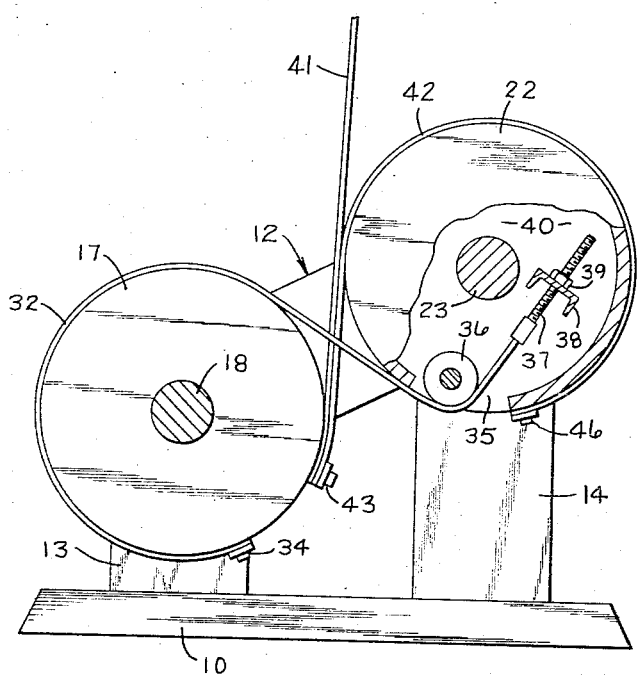
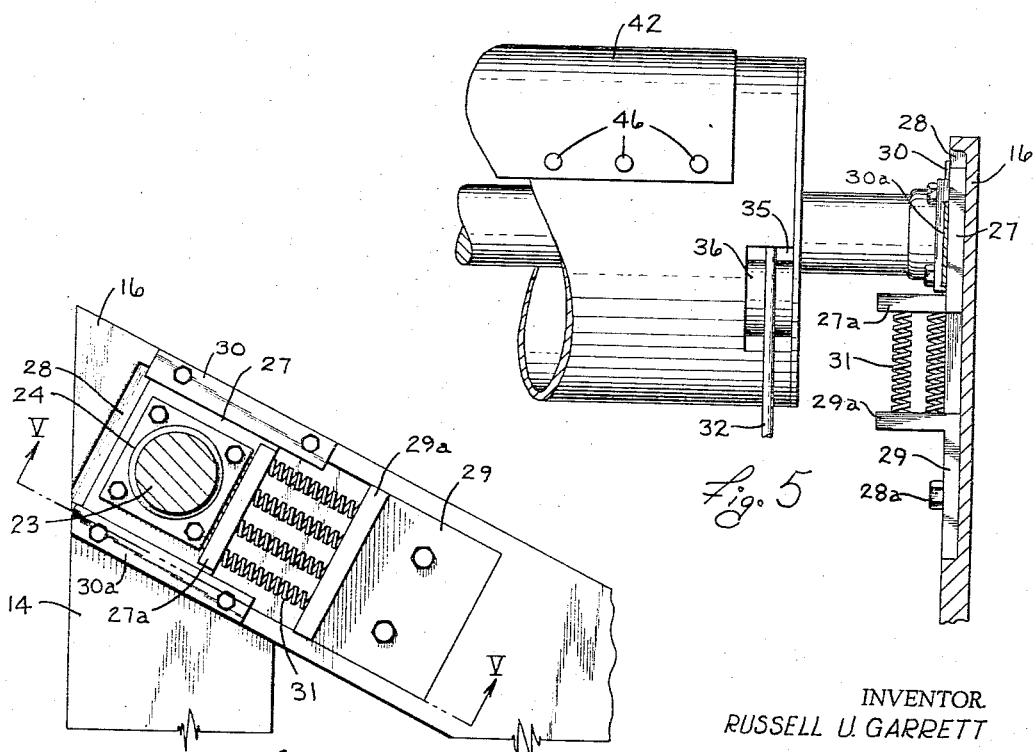
INVENTOR.
RUSSELL U. GARRETT
BY
Woodhams, Blanchard and Flynn
ATTORNEYS Sept. 5, 1967　　　　　R. U. GARRETT　　　　　3,340,132
LAMINATING PROCESS AND APPARATUS
Filed Aug. 15, 1963　　　　　　　　　　　　3 Sheets-Sheet 3

INVENTOR.
RUSSELL U. GARRETT
BY
Woodhams, Blanchard & Flynn
ATTORNEYS

United States Patent Office 3,340,132
Patented Sept. 5, 1967

3,340,132
LAMINATING PROCESS AND APPARATUS
Russell U. Garrett, Ross Township, Kalamazoo County, Mich. (Box 644, R.R. 1, Augusta, Mich. 49012)
Filed Aug. 15, 1963, Ser. No. 302,247
7 Claims. (Cl. 156—580)

This invention relates in general to a process and an apparatus for shaping sheet-form materials, such as metal or plastic sheets, to conform to the shape of a portion of a cylinder and, more particularly, relates to a process and an apparatus for shaping and forming the printing layer for a plastic-backed printing plate so as to achieve an intimate contact between the uneven contour of the back of the printing layer and the plastic backing sheet therefor in order to form a high quality, laminated printing plate adapted for use on a rotary printing press.

The present invention was developed while attempting to solve the problems encountered in bending, and achieving intimate, uniform contact between the printing layer and the plastic backing sheet of a laminated, plastic-backed and curved printing plate. Accordingly, the following description will proceed primarily with reference to printing plates of this type. However, it will be understood that the present invention can be used for bending various sheet-form materials for different purposes so that specific reference to the formation of a plastic-backed printing plate shall be for illustrative purposes only and shall not be construed as a limitation on the utility of the invention.

There is disclosed in my copending application, Ser. No. 203,965, now abandoned, which was replaced by continuation-in-part application Ser. No. 213,446, now Patent No. 3,211,091, a laminated, plastic-backed and curved printing plate which consists of a printing layer, such as an electrotype shell, an intermediate plastic layer and a metal backing sheet, all of which are bonded together by an adhesive to form a printing plate curved in the shape of a portion of a cylinder for use on a rotary printing press.

A commercially acceptable printing plate of this type must have a uniform and a sufficiently long-lasting bond between the laminae to be commercially acceptable. This is particularly true of the bond between the printing layer and the plastic backing sheet. The probabilities of achieving such a bond are much greater if the laminae are in intimate contact before they reach the cure temperature of the adhesive used to bond them together. In the present commercial procedure for making such plates, the adhesive is usually either sprayed or brush coated onto each lamina. However a moldable adhesive film may also be used between adjacent laminae, as disclosed in my above-mentioned application. Even if a moldable adhesive film of this type is used, intimate contact between the laminae must be achieved before the temperature of the adhesive reaches a value such that the adhesive begins to cure to an appreciable degree in order to achieve a uniform and long-lasting bond.

The maintenance of an intimate and uniform contact between smooth-surfaced laminae, such as the metal backing sheet and the plastic layer, is not a problem. However, it is very difficult to achieve an intimate and uniform contact between the plastic layer and the uneven, underneath surface of the printing layer by using the presently accepted apparatuses and processes for fabricating the plates.

The presently accepted apparatus for laminating this type of printing plate includes an air-activated, expandable rubber diaphragm. In the use of this type of apparatus the preshaped and preheated laminae are placed in a stack, printing layer down, on a heated concave platen and pressure is applied to the back of the laminae by means of the diaphragm. The pressure exerted by the diaphragm will be substantially uniform over the entire area of the diaphragm and thus over the entire area of the printing layer. It follows, therefore, that there is just as much pressure on the edges of the printing layer as there is on the central region of the printing layer and there is just as much pressure on the low spots of the printing layer as on the high spots. This will cause the resulting printing plate to be of nonuniform thickness so that it would not produce acceptable printing. It is possible that a small amount of gravitational deflection or flow of the plastic layer, which otherwise is somewhat stiff, may take place during the preheat cycle but such is not enough to effect an intimate, uniform contact between the plastic layer and the printing layer over the entire surface of the printing layer. Thus, there will be open spaces between the plastic layer and the printing layers in some areas, particularly in the low spots. These spaces will probably contain either air, water vapor from the surface moisture or vapors of the solvent for the adhesive, or mixtures of these gases, and such will prevent intimate, uniform contact of the plastic layer and the printing layer.

As pressure is applied to the back of the stacked laminae, the plastic layer will first be pressed against the high spots on the back of the printing layer so that any air or vapor remaining in the low areas of the printing layer will become sealed therein. Furthermore, since intimate, uniform contact between the plastic layer and the printing layer is not achieved during the preheat cycle and during the early stages of the bonding cycle, it is reasonable to assume that the adhesive in the areas of no contact will become cured to some degree and possibly completely cured, before an intimate contact is achieved between the plastic layer and the printing layer. This will result in a weak bond or no bond at all between the plastic layer and the printing layer in these areas.

Various techniques have been suggested for dealing with this problem, including the use of cheese cloth or gauze between the layers of the printing plate to provide avenues of escape for the trapped air and vapors. At best these techniques involve additional labor and expense and, moreover, they are not completely satisfactory because they do not insure a uniform, intimate bond over the entire surface of the printing layer, particularly if the adhesive is partially cured before the layers are pressed into intimate contact.

Accordingly, it is an object of this invention to provide an improved process and apparatus for bending a sheet-form member and simultaneously pressing it into intimate, uniform contact with other laminae.

It is a further object of this invention to provide an improved process and apparatus for progressively bending a printing layer for a laminated printing plate into the shape of a portion of a cylinder and simultaneously pressing it into intimate, uniform contact with a plastic backing layer whereby a printing plate of substantially uniform thickness across its face and having a long-lasting bond between the laminae thereof can be obtained.

It is a further object of this invention to provide a process and apparatus, as aforesaid, in which heating to cure the adhesive in order to bond the laminae takes place after said laminae have been urged into intimate, uniform contact and while they are held under a relatively high pressure.

It is a further object of this invention to provide an apparatus, as aforesaid, which is inexpensive to manufacture, which is rugged and durable so as to minimize maintenance costs, and which is relatively simple to operate so that personnel can operate same with a minimum of training.

It is a further object of this invention to provide an apparatus, as aforesaid, which automatically compensates for any misalignment of the parts or varitions in the thickness of the materials being formed on the apparatus.

Other objects and advantages of the invention will become apparent to persons acquainted with equipment of this type upon reading the following description and inspecting the accompanying drawings.

In the drawings:

FIGURE 1 is a front elevational view of an apparatus embodying the invention.

FIGURE 2 is a side elevational view of the apparatus taken from the right side thereof as appearing in FIGURE 1 and also showing a sheet reeling device associated with the apparatus.

FIGURE 3 is a broken sectional view taken along the line III—III in FIGURE 1.

FIGURE 4 is a sectional view taken along the line IV—IV in FIGURE 1.

FIGURE 5 is a sectional view substantially as taken along the line V—V in FIGURE 2 or FIGURE 4.

*General description*

Figure 6:
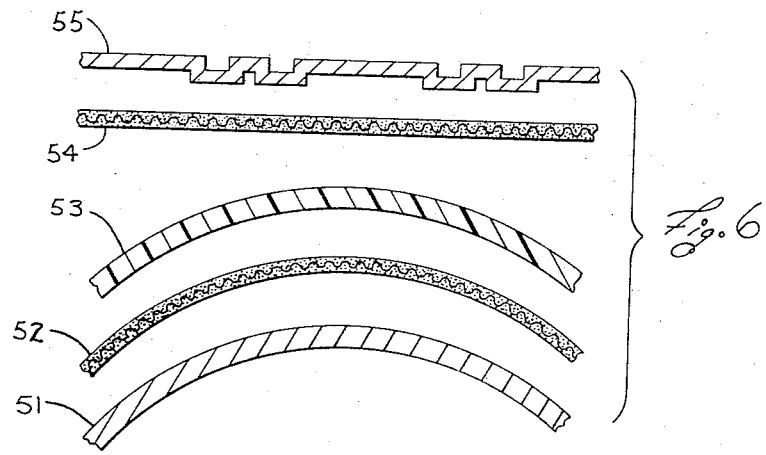
FIGURE 6 is an exploded sectional view through the laminae of the printing plate prior to lamination by the process and apparatus of the invention.

According to the process aspects of the invention, there is provided a laminating and/or bending process in which the sheet-form members are placed on or in association with a drum. The drum is rotated and a pressure member is wound upon the drum simultaneously and engages the sheet-form members so that said members are compressed and conformed to the shape of the drum.

According to the apparatus aspects of the invention, there is provided a laminating and/or bending apparatus comprising a pair of rotatable, spaced and radially aligned drums which are supported for movement toward and away from each other. An elongated, flexible pressure member is warpped partway around the periphery of one drum and is connected to the drums so that it can be wound up on the other drum as it is unwound from the first-mentioned drum. The drums are connected for simultaneous rotation at the same peripheral speeds. Thus, when workpiece means are placed between said pressure member and the other drum, and the drums are rotated, the drums will move toward each other and the workpiece means will be pressed against the periphery of the other drum by the pressure member as it is wound on said other drum.

*Detailed description*

The apparatus and process aspects of the invention will be disclosed by describing first the apparatus, following which the operation will be set forth.

Referring to the drawings, the apparatus 9 of the invention is comprised of a base 10 having a pair of upstanding end supports 11 and 12, which are identical. Each end support is comprised of a short front leg 13, a long rear leg 14 and a frontwardly inclined cross member 16 which extends between the upper ends of said legs.

A lower roller or drum 17 is disposed horizontally between the short legs 13 of the end supports 11 and 12. The support and driving shaft 18 for the drum 17 is rotatably supported by bearings 19 and 21 which are mounted on the legs 13 adjacent the upper ends thereof. The shaft 18 is rotatable by a reversible motor 15 which is connected to said shaft through a combined clutch and brake unit 20 of any suitable, conventional type.

An upper roller or drum 22 is disposed horizontally between the upper ends of the long legs 14 of the end supports 11 and 12. It is desirable that the drum 22 be of diameter larger than the diameter of the drum 17 by an amount sufficient to permit the laminae to be handled without exceeding the working limits of the springs 31.

In a particular embodiment of the invention, the radius of the drum 22 was made about .080 inch larger than the radius of the drum 17. In cases where the material to be laminated is particularly thick, the drum 22 may be of a larger size to reduce the working changes in spring length caused by the increase in the effective circumference of the drum 17 due to the addition of the laminae thereto. Alternatively, however, springs having a longer useful differential length may be used.

The support shaft 23 for the drum 22 is rotatably supported by bearings 24 and 26 which are slidably supported on the end supports 11 and 12 for movement in a direction lengthwise of the cross member 16 toward and away from the lower drum 17. Here the bearings 24 and 26 are each affixed to an L-shaped plate 27 (FIGURE 5) which is slidable within an elongated recess 28 in the cross member 16, said recess extending lengthwise of said cross member. An L-shaped bracket 29 is secured by a bolt 28a to the cross member 16 at the end of the recess 28 which is closer to the short leg 13. Springs 31 are disposed between the flanges 27a and 29a, respectively, of the plate 27 and bracket 29 to urge said plate 27, hence the upper drum 22, away from the lower drum 17. Thus, the drums 17 and 22 are supported in parallel relationship, and the drum 22 is offset rearwardly and upwardly from the drum 17. Drum 22 is capable of moving bodily toward the drum 17, but it is normally and resiliently held a maximum distance therefrom by the springs 31.

A pair of guides 30 and 30a (FIGURE 4) are secured to cross member 16 and extend over the side edges of the plate 27 to confine said plate within the recess 28 and guide its movement therein.

A pair of cables 32 and 33 (FIGURE 1), which are made of a suitable high-strength material, such as hardened and tempered steel, are mounted in the same fashion at one end of each upon said drum 17 adjacent the axial ends of the drum. Thus, a description of the mounting of cable 32 will suffice as a description of both cables. One end of the cable 32 (FIGURE 3) is affixed to the lower drum 17 by a suitable fastener 34. The cable extends partway around the periphery of the drum 17 and then passes across the gap between the drums 17 and 22 and through a slot 35 in the periphery of the drum 22, thence around a guide roller 36 which is rotatably mounted within said upper drum 22 adjacent the periphery thereof.

The other end of the cable 32 (FIGURE 3) has a screw 37 affixed thereto and extending axially therefrom through an opening in a channel-shaped mounting bracket 38 which is affixed to an internal, transverse wall 40 in the drum 22. A nut 39 is threaded onto the screw 37 and is adapted to engage the web of the bracket 38 whereby the cable 32 can be moved toward and away from said bracket to vary the cable tension. An access opening 45 is provided in the axial end wall 22a (FIGURE 2) of the drum 22 whereby the nut 39 may be adjusted. As best shown in FIGURE 3, when the drums 17 and 22 are spaced apart the maximum distance and the apparatus is in its starting position, the end of the cable 32 affixed to the drum 17 is disposed close to the lowermost point on the drum and it contacts in excess of 180 degrees of the periphery of said lower drum 17.

A pair of flexible sheets 41 and 42 (FIGURE 3), which are both made of a suitable high-strength material, are affixed along corresponding first or lower edges thereof to the lower drum 17 by suitable fasteners 43, said lower edges being spaced circumferentially a short distance from the points at which the cables 32 and 33 are secured to said drum. The inner sheet 41, which preferably is made of stainless steel, extends upwardly through the gap between the drums 17 and 22 and its upper end is supported by suitable means, such as by a conventional sheet reeling device 44 (FIGURE 2), so that said sheet is supported in a taut condition but is free to move downwardly in response to rotation of the drum 17 so that it can be wrapped therearound. The outer sheet 42, which preferably is made of tempered spring steel, also extends upwardly through the gap between the drums 17 and 22 (FIGURE 3) and then is wrapped partway around the upper drum 22. The other end of the sheet 42 is affixed to said upper drum by fasteners 46, said other end of said sheet being located close to but spaced circumferentially from the guide roller 36. The sheets 41 and 42 preferably are of the same width which is somewhat less than the perpendicular distance between the cables 32 and 33.

Suitable heating means, such as a resistance heating coil 47 (FIGURE 2), are provided within the lower drum 17. If desired, the heating means may be controlled by a thermostat so as to maintain a suitable controlled temperature in the drum 17 for effecting at least partial curing of the adhesive. Further, if desired or necessary, the lower drum 17 could be provided with cooling coils (not shown) in order to make it possible to cool the workpieces formed on the apparatus 9.

*Operation*

Before describing a typical bending and/or laminating operation, it is believed desirable to describe the manner in which the parts function to apply pressure on the workpiece means. Referring to FIGURE 3, the drums 17 and 22 and associated parts are shown in their starting positions in which said drums are spaced apart the maximum distance. The cables 32 and 33 and the sheet 42 are under tension and the springs 31 are somewhat compressed. The extent of compression of the springs 31 can be adjusted by threading the nut 39 and its counterpart at the other axial end of the drum 22 along their associated screws. This will cause the drum 22 to slide along the cross members 16 toward the drum 17. The cables 32 and 33 will be firmly pressed against the periphery of the lower drum 17 whereby the upper drum 22 is locked against any relative rotation in a counterclockwise direction, as appearing in FIGURE 3, with respect to the lower drum 17. Simultaneously, the sheet 42 will be firmly pressed against the periphery of the drum 22 so that clockwise rotation of the drum 17 as appearing in FIGURE 3 will effect counterclockwise rotation of drum 22 and an unwinding of the sheet 42 from drum 22. Where the drums 17 and 22 are of the same diameter, rotation of drum 17 in a clockwise direction will cause drum 22 to rotate in a counterclockwise direction at the same rotational speed. However, even if drum 22 is of different size than drum 17, their peripheral speeds will be the same when one of them is urged to rotate.

The nut 39 (FIGURE 3) and its counterpart at the other axial end of the drum 22 will be tightened, whereby the springs 31 will be compressed, so that they place a suitable tension upon the sheet 42 and the cables 32 and 33. In one typical embodiment of the invention, the springs 31 each exert a force of about 680 pounds to urge the drum 22 away from the drum 17, but these forces can be modified to suit the physical properties of the workpieces being handled.

Figure 7:
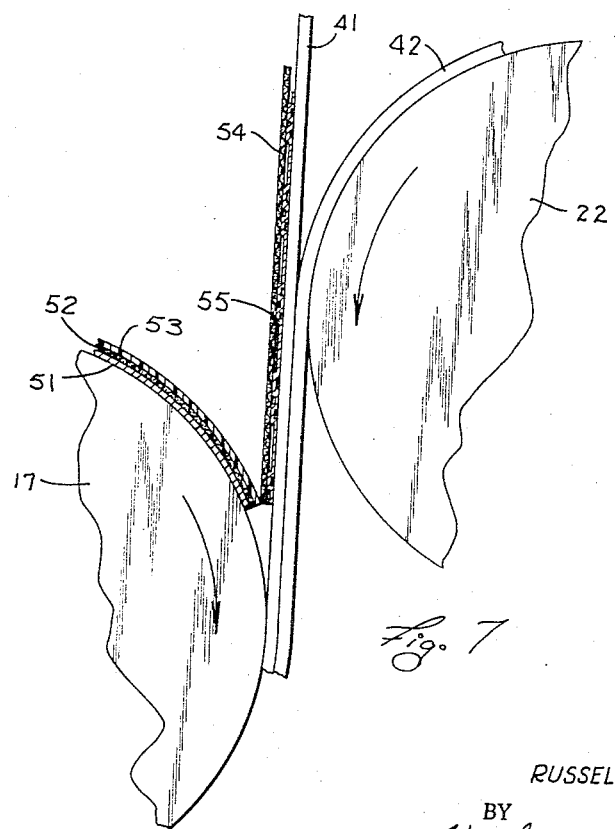
FIGURE 7 is a schematic fragment of FIGURE 3 showing the manner in which the laminae are positioned on the apparatus at the start of a laminating operation.

The workpiece means (FIGURE 6), which the apparatus is particularly designed to handle, consist of a metal backing sheet 51, a fabric layer 52 impregnated with adhesive, a plastic backing layer 53, another adhesive-impregnated fabric layer 54 and, finally, a printing layer 55. When assembled and bonded together, these parts will form a plastic-backed printing plate of the type disclosed in my above-identified application. The sheet 51, layer 52 and layer 53 ordinarily will be precurved to fit the drum 17 while the layers 54 and 55 will be flat. In operation, as shown in FIGURE 7, the sheet 51 and layers 52 and 53 are arranged in a stack and are placed on the drum 17 with the sheet 51 contacting said drum and with the lower edges of these laminae being aligned and located along a line close to that at which the sheet 41 extends tangentially away from said drum 17. The drum 17 is heated by the heating coil 47 to a temperature sufficient to cause softening of the adhesive in the layer 52 and plastic in the layer 53.

When the adhesive in layer 52 and the plastic in the layer 53 become softened, the layer 54 and the printing layer 55 are placed substantially parallel with the sheet 41 and are moved downwardly therealong as far as possible. The motor 15 and the unit 20 are then actuated to effect slow clockwise rotation of the drum 17, as appearing in FIGURES 3 and 7. This also effects rotation of the drum 22 at the same speed but in a counterclockwise direction. The sheet 51 and layers 52, 55 and 53 will be carried by the drum and the sheets 41 and 42 will be wound on the drum 17. As the printing plate laminae 51–55 move downwardly between the periphery of drum 17 and sheets 41 and 42, they will force the sheets 41 and 42 away from the periphery of the drum 17, thereby, in effect, increasing the radius of said drum. Thus, the circumference about which the sheet 42 is being wrapped increases, which would tend to cause drum 22 to rotate at a faster peripheral speed than drum 17. However, this is prevented by the cables 32 and 33 and the result is that drum 22 is moved along the cross member 16 toward drum 17, thereby further compressing the springs 31. Also, the points at which sheets 41 and 42 begin to extend tangent to the drum move upwardly in a counterclockwise direction with respect to drum 17, as drum 22 moves toward drum 17.

As the drum 17 is rotated, the sheets 41 and 42 force the layers 53 and 54 into all the irregular contours and voids in the back of the printing layer 55 and this will occur before the adhesive in the layer 54 has a chance to cure. Further, because the layers 54 and 55 are in effect rolled onto the layer 53, the air and/or vapor present therebetween will be squeezed out and can readily escape. Thus, an intimate and uniform contact will be achieved between the various layers of the workpiece means over their entire surface so that a good bond can be achieved therebetween. Further, the laminated product will be of substantially uniform thickness across its surface except for the printing indicia. Since the printing layer 55 and the layer 54 are thin they will heat rapidly after they are first urged into uniform, intimate contact with each other and with the plastic layer 53.

If desired, only a preliminary bonding of the layers need be accomplished in the apparatus 9 (FIGURE 1), in which case the laminae will remain in the apparatus 9 only long enough to provide such preliminary bonding. The assembled plate would then be transferred to a final press for completing the curing of the adhesive. This would be particularly desirable in a high production type of plate-making operation. Alternatively, the entire bonding operation can be effected in the apparatus 9 by holding the assembled plate therein until the adhesive is fully cured. If this latter procedure is followed, it would be desirable to provide cooling means in the drum 17 in order to speed up the process.

The assembled plate is removed from the apparatus 9 by rotating the drum 17 in the opposite, that is, counterclockwise direction. If necessary, other operations, such as shaving the back of the plate, can be performed on the plate prior to mounting on the printing press, all in accordance with conventional practice.

While the apparatus has been disclosed as being used to perform a bending and laminating operation, it will be apparent that the apparatus can be used for only bending a sheet-form article, or it can be used only for urging laminae together for pressure bonding purposes, where no substantial bending is required. However, because of the roll-on type of operation effected by the apparatus, it is particularly useful where a simultaneous bending and laminating procedure is to be carried out.

While a particular preferred embodiment of the invention has been described, the invention contemplates such changes and modifications therein as lie within the scope of the appended claims.

What is claimed is:
1. A pressure-applying apparatus, comprising:
a pair of spaced and radially aligned drums mounted for rotation about substantially parallel axes;
means supporting said drums for relative movement toward and away from each other;
force-applying means for urging said drums apart;
an elongated, flexible pressure member secured at one end thereof to one of said drums and extending partway around the peripheral surface thereof and thence through the space between said drums, said pressure member having its other end secured to the other drum so that rotation of said other drum in one circumferential direction will effect unwinding of said pressure member from said one drum and winding of said pressure member on said other drum;
means connecting said drums for effecting rotation of said drums at the same peripheral speeds when said other drum is rotated in the other circumferential direction whereby when a workpiece is placed between said pressure member and said other drum and said other drum is rotated in said one circumferential direction, said one drum will move toward said other drum against the urging of said force-applying means and said workpiece will be bent into conformity with the periphery of said other drum by said pressure member.

2. An apparatus according to claim 1, in which the axes of said drums are vertically and horizontally offset from each other with the axis of said other drum being disposed below the axis of said one drum;
a base and means rotatably mounting said other drum on said base and holding said other drum against horizontal and vertical movement with respect to said base; and
journal means rotatably supporting said one drum and means mounting said journal means on said base for sliding movement with respect thereto toward and away from said other drum.

3. An apparatus according to claim 2, in which the force-applying means are disposed between said base and said journal means.

4. An apparatus according to claim 3, in which said force-applying means consist of springs.

5. An apparatus according to claim 1, in which said connecting means comprise cable means secured at one end thereof to said other drum, said cable means extending partway around said other drum, thence passing through the space between said drums and having its other end secured to said one drum whereby said cable means will be unwound from said other drum and will be wound on said one drum when said other drum is rotated in said one circumferential direction.

6. An apparatus according to claim 1, in which said pressure member is a sheet.

7. An apparatus according to claim 6, including a second sheet secured at one end thereof to said other drum between said other drum and the first-mentioned sheet and extending therefrom through the space between said drums.

References Cited
UNITED STATES PATENTS

| | | | |
|---|---|---|---|
| 2,154,474 | 4/1939 | Scott | 156—583 X |
| 2,788,838 | 4/1957 | Crabbe et al. | 156—498 X |
| 2,870,312 | 1/1959 | Westervelt | 219—546 X |
| 3,075,868 | 1/1963 | Long | 156—82 |

EARL M. BERGERT, *Primary Examiner.*

H. F. EPSTEIN, *Assistant Examiner.*